United States Patent [19]

Kubo et al.

[11] 4,384,081
[45] May 17, 1983

[54] PROCESS FOR PRODUCTION OF HYDROGENATED CONJUGATED DIENE POLYMERS

[75] Inventors: Yoichiro Kubo, Yokohama; Tetsu Ohishi, Tokyo; Kiyomori Ohura, Kamakura, all of Japan

[73] Assignee: Nippon Zeon Co., Ltd., Tokyo, Japan

[21] Appl. No.: 342,591

[22] Filed: Jan. 25, 1982

Related U.S. Application Data

[63] Continuation of Ser. No. 213,369, Dec. 5, 1980.

[30] Foreign Application Priority Data

Dec. 8, 1979 [JP] Japan ................................. 54-159358

[51] Int. Cl.$^3$ ............................................... C08K 3/10
[52] U.S. Cl. ..................................... 525/339; 525/338
[58] Field of Search ................................ 525/338, 339

[56] References Cited

U.S. PATENT DOCUMENTS 3,598,886  8/1971  Hoeg et al. ..................... 260/879 R
4,337,329  6/1982  Kubo et al. .......................... 525/339

FOREIGN PATENT DOCUMENTS 2011911  7/1979  United Kingdom .

Primary Examiner—Joseph L. Schofer
Assistant Examiner—Bernard Lipman
Attorney, Agent, or Firm—Sherman & Shalloway

[57] ABSTRACT

A process for producing a hydrogenated conjugated diene polymer, which comprises hydrogenating the carbon-carbon double bonds of a conjugated diene polymer in a solvent using a supported catalyst composed of a hydrogenating catalyst supported on a carbon carrier having an average particle diameter of 5 m$\mu$ to 10$\mu$ and a specific surface area of 5 to 2000 m$^2$/g, and after the hydrogenation reaction has been completed, separating and recovering the hydrogenated conjugated diene polymer from the solution of the hydrogenated polymer without separating the catalyst therefrom.

4 Claims, No Drawings

PROCESS FOR PRODUCTION OF HYDROGENATED CONJUGATED DIENE POLYMERS

This is a continuation of application Ser. No. 213,369, filed Dec. 5, 1980.

This invention relates to an improvement in a process for producing a hydrogenated conjugated diene polymer. More specifically, it relates to a process for producing a hydrogenated conjugated diene polymer, which comprises hydrogenating the carbon-carbon double bonds of a conjugated diene polymer in solution using a hydrogenating catalyst supported on a carrier, and after the hydrogenation reaction, separating and recovering the hydrogenated conjugated diene polymer from the hydrogenated conjugated diene polymer solution without separating the supported catalyst therefrom.

In the production of a hydrogenated polymer, it is the general practice to perform the hydrogenating reaction using a supported catalyst composed of a hydrogenating catalyst comprising a metallic element or non-metallic element supported on a carrier such as activated carbon in the suspended state in a solution, remove the used catalyst from the hydrogenated polymer solution by a suitable treating means after the hydrogenating reaction has been completed, and thereafter separate and recover the hydrogenated polymer. The removal of the catalyst from the solution is for the purpose not only of recovering the catalyst for reuse, but also preventing a certain kind of catalyst element remaining in the hydrogenated polymer from exerting adverse effects, such as degradation, on the polymer. The carrier used is generally of a large particle diameter in order to facilitate separation of the catalyst. Since, however, a carrier of a large particle diameter, if it remains in the hydrogenated polymer, would markedly reduce the strength characteristics of a vulcanized product of the polymer, the carrier should be separated together with the catalyst.

Separation of the supported catalyst from the reaction mixture is effected frequently by a filtration method using various filters or a centrifugal separating method. In contrast to the hydrogenation of a low-molecular-weight compound, in the case of hydrogenation of a polymer, the reaction system has a high viscosity. Accordingly, it is very difficult to separate the supported catalyst from such a reaction system. Separation will become easy if the viscosity of the reaction system is decreased by adding a large amount of a solvent, or using a filtration aid. This, however, gives rise to new problems. For example, a great deal of heat energy is consumed for recovery and regeneration of the solvent. Or the separation of the filtration aid from the catalyst is not easy.

If a carrier of smaller diameter is used, the catalyst activity increases, but the catalyst becomes difficult to separate. Increasing of the particle diameter of the carrier in an attempt to facilitate separation will result in the reduction of the catalytic activity. Thus, since the requirement for increased catalytic activity is contradictory to that for the separatibility of the catalyst, a great deal of efforts have been made in selecting a carrier which will facilitate separation of a catalyst without reducing its catalytic activity. For example, it was proposed to use a molded carrier of improved strength obtained by granulating carbon black, treating it with a carbonizable binder, and calcining and carbonizing the treated product (Japanese Laid-Open Patent Publication No. 40897/79).

It is an object of this invention therefore to provide a process for producing a hydrogenated conjugated diene polymer which does not require separation of a carrier supported catalyst.

In accordance with this invention, this object is achieved by a process for producing a hydrogenated conjugated diene polymer, which comprises hydrogenating the carbon-carbon double bonds of a conjugated diene polymer in solution using a supported catalyst composed of a hydrogenating catalyst supported on a specified carbon carrier, and after the hydrogenation reaction has been completed, separating and recovering the conjugated diene polymer without separating the catalyst from the hydrogenated polymer solution.

Since according to the process of this invention, it is not necessary to use a large amount of a solvent for dilution, the solvent can be easily recovered and regenerated. Furthermore, because the supported catalyst does not have to be separated, it is not necessary to use a filtration aid, etc. Moreover, various devices for separation of the supported catalyst such as a decanter, a centrifugal separator and a filter are not at all required. This is economically advantageous in that the hydrogenating process can be very much simplified. The particle diameter of carbon used as a carrier is not restricted, and it is only necessary to consider its allowable maximum particle diameter. Hence, according to this invention, the hydrogenation reaction can be performed by using a highly active catalyst supported on carbon having the smallest possible particle diameter.

The carbon carrier used in this invention has an average particle diameter of 5 m$\mu$ to 10$\mu$, preferably 20 m$\mu$ to 10$\mu$ and a specific surface area of 5 to 2000 m$^2$/g, preferably 20 to 1500 m$^2$/g, in view of the activity of the supported catalyst and of the fact that the catalyst is allowed to remain in the resulting hydrogenated polymer.

One example of such carbon is powdery activated carbon. Another example is carbon black used for coloration, or as a reinforcing agent for rubber or as an electrically conductive filler, that is, carbon black produced from petroleum-type or coal-type heavy oils, natural gases, etc. as raw materials by the furnace process or channel process. Specific examples of the carbon black are FF, HMF, SRF, etc. produced by the gas furnace process, SAF, HAF, ISAF, FEF, CF, etc. produced by the oil furnace process; and coloring HCC, MCC, etc. and EPC, MPC, etc. for rubber which are produced by the channel process. A suitable carbon may be selected by considering the catalytic activity and effects on the properties of a vulcanized product of the hydrogenated polymer. SRF, FEF or CF type carbon blacks are preferred, and CF-type carbon black having a specific surface area of more than 700 m$^2$/g is most preferred.

The hydrogenating catalyst used in this invention may be any hydrogenating catalyst which is a metal element catalyst or non-metal element catalyst having hydrogenating activity and does not adversely affect the resulting polymer even if it remains there after the polymerization. Specifically, it may comprise at least one element selected from the group consisting of Ru, Rh, Pd, Ir, Os, Pt, Ag and Au. A catalyst composed of both Pd and at least one element selected from the group consisting of elements of Groups Ia, IIa, IIIa, IIIb, IVa, IVb, Va, VIa and VIIa, Ag, Au, Sb and Te is especially preferred because it has high activity and a high hydrogenating efficiency, and it does not adversely affect the hydrogenated polymer even when it remains there.

The metal element or non-metal element may be supported on the carbon carrier by any conventional method for preparing supported catalysts. For example, the aforesaid metal element or non-metal element is directly supported on the carbon carrier. Or an aqueous solution of a salt of such an element is impregnated in the carbon carrier, followed by reduction to provide a carbon-supported catalyst.

The amount of the catalyst element supported on the carbon carrier is 0.001 to 30% by weight, preferably 0.01 to 10% by weight, based on the carrier.

The amount of the carrier-supported catalyst used may be properly determined according to the type of the polymer to be hydrogenated, and the desired degree of hydrogenation. If it is too large, adverse effects are exerted on the properties of vulcanized products of the resulting polymer. Hence, it is usually not more than 2000 ppm, preferably not more than 1000 ppm, as the amount of the element supported.

The conjugated diene polymer used in this invention is prepared by polymerizing 10 to 100% by weight of a conjugated diene monomer and 90 to 0% by weight of an ethylenically unsaturated monomer by solution polymerization, emulsion polymerization, etc. Examples of the conjugated diene monomer are 1,3-butadiene, 2,3-dimethylbutadiene, isoprene, and 1,3-pentadiene. Examples of the ethylenically unsaturated monomer include unsaturated nitriles such as acrylonitrile and methacrylonitrile; monovinylidene aromatic hydrocarbons such as styrene and alkylstyrenes (e.g., o-, m- and p-methylstyrene and ethylstyrene); unsaturated carboxylic acids and the esters thereof such as acrylic acid, methacrylic acid, crotonic acid, itaconic acid, maleic acid, methyl acrylate, ethyl acrylate, butyl acrylate, 2-ethylhexyl acrylate, and methyl methacrylate; vinyl pyridine; and vinyl esters such as vinyl acetate. Typical examples of the conjugated diene polymer are polybutadiene, polyisoprene, a butadiene/styrene random or block copolymer, and an acrylonitrile/butadiene random or block copolymer.

When a polymer obtained by solution polymerization is used as a starting polymer, the resulting polymer solution is directly hydrogenated. When the polymer is a solid, it is dissolved in a solvent and hydrogenated in solution. The concentration of the polymer solution is 1 to 70% by weight, preferably 1 to 40% by weight. Any solvent may be used which does not adversely affect the catalyst and can dissolve the polymer to be hydrogenated. Examples include benzene, toluene, xylene, hexane, cyclohexane, tetrahydrofuran, acetone, methyl ethyl ketone, ethyl acetate, and cyclohexane.

The reaction temperature is 0° to 300° C., preferably 20° to 150° C. At a reaction temperature of more than 150° C., side-reactions tend to take place, and this is undesirable for selective hydrogenation. For example, the solvent may undergo hydrogenation, or the ethylenically unsaturated monomer unit other than the conjugated diene unit of the polymer, for example, the nitrile group of acrylonitrile or the benzene ring of styrene, may undergo hydrogenation.

The pressure of hydrogen is a from atmospheric pressure to 300 kg/cm$^2$, preferably 5 to 200 kg/cm$^2$. Pressures higher than 300 kg/cm$^2$ may be used, but are not feasible in commercial practice because the cost of equipment increases and the handling of the apparatuses is troublesome.

After the hydrogenation is completed, the hydrogenated polymer is separated from the polymer solution containing the carrier-supported catalyst by any method which is usually employed in recovering a polymer from a polymer solution. For example, the separation can be effected by a steam coagulation method which involves directly contacting the polymer solution with steam, a drum drying method which comprises dropping the polymer solution onto a heated rotating drum and allowing the solvent to evaporate off, and a method which comprises adding a non-solvent to the polymer solution of precipitate the polymer. The hydrogenated polymer containing the supported catalyst can be separated from the solution by using such a separating method. The separated polymer is subjected to a water-removing step and a drying step by, for example, hot air drying, vacuum drying or extrusion drying to recover the hydrogenated polymer as a solid.

The hydrogenated conjugated polymer obtained by the process of this invention and containing the carrier-supported catalyst is the same in properties from a hydrogenated conjugated diene polymer not containing the catalyst, and can be used in a wide range of applications because of its excellent weatherability, ozone resistance, thermal stability and cold climate resistance.

The following non-limitative Examples illustrate the present invention specifically.

The average particle diameter of carbon black was determined from a particle diameter distribution curve which was obtained by measuring the particle diameter by an electron microphotograph. The specific surface area of the carbon black is calculated by the BET method from the amount of nitrogen absorbed which was measured by the low temperature nitrogen adsorption method.

The degree of hydrogenation of the carbon-carbon double bonds was measured by the iodine value method.

REFERENTIAL EXAMPLE 1

Using HCC, FEF, MPC, SRF and CF type carbon blacks and activated carbons, 3% by weight of Pd or Rh was supported on each of these carriers.

These carrier-supported catalysts were each prepared by dipping carbon black or activated carbon in an aqueous solution of PdCl$_2$ or RhCl$_3$ and reducing the Pd or Rh salt with formaldehyde/sodium hydroxide in accordance with an ordinary method for preparing an activated carbon-supported catalyst.

An autoclave was charged with an acetone solution of an acrylonitrile/butadiene copolymer (amount of bonded acrylonitrile 39.4%; ML$_{1+4,100°\,C.}$=53) and 2 or 3 parts by weight, per 100 parts by weight of the copolymer, of the carrier-supported catalyst obtained as above. The inside of the autoclave was purged with nitrogen, and the copolymer was hydrogenated at 60° C. for 4 hours while passing hydrogen under a pressure of 20 kg/cm$^2$.

The results are shown in Table 1.

TABLE 1

| | Carbon carrier | | Degree of hydrogenation (%) | |
|---|---|---|---|---|
| | | | Pd catalyst | Rh catalyst |
| Type | Average particle diameter | Specific surface area (m²/g) | (3 parts by weight per 100 parts by weight of the polymer) | |
| HCC[(1)] | 12 mμ | 560 | 60.0 | |
| FEF[(2)] | 36 mμ | 55 | 37.4 | 45.3 |
| MPC[(3)] | 28 mμ | 110 | 57.5 | |
| SRF[(4)] | 65 mμ | 27 | 28.3 | |
| CF[(5)] | 30 mμ | 1000 | 95.6(*) | 90.3 |
| Activated carbon | 3μ | 1300 | 85.0 | 57.1 |
| Activated carbon | 40–50μ | 1300 | 82.9 | 45.0 |

(*)The amount of the catalyst was 2 parts by weight per 100 parts by weight of the polymer.
[(1)]High Color Channel, a product of Cabot Co.
[(2)]Asahi #60 (Fast Extrusion Furnace), a product of Asahi Carbon Co., Ltd.
[(3)]Spheron 6 (Medium Processing Channel), a product of Cabot Co.
[(4)]Asahi #50 (Semi-Reinforcing Furnace), a product of Asahi Carbon Co., Ltd.
[(5)]Ketjen Black EC (Conductive Furnace), a product of Akzo Co.

The changes of the microstructure of the butadiene portion of the above copolymers determined by infrared absorption spectroscopy and the amount of combined acrylonitrile determined by nitrogen analysis in accordance with the Kjeldahl method are shown in Table 2.

TABLE 2

| Sample | Amount of combined acrylonitrile (% by weight) | Microstructure of the butadiene portion (% by weight) | | | |
|---|---|---|---|---|---|
| | | Hydrogenated portion | Unhydrogenated portion | | |
| | | | 1,4-trans | 1,4-cis | 1,2-vinyl |
| Unhydrogenated copolymer | 39.4 | 0 | 48.0 | 0.8 | 11.8 |
| Hydrogenated copolymer (degree of hydrogenation 67.4%; FEF—Pd) | 39.4 | 40.8 | 19.5 | trace | 0.3 |
| Hydrogenated copolymer (degree of hydrogenation 95.6%; CF—Pd) | 39.4 | 57.9 | 2.7 | 0 | 0 |

REFERENTIAL EXAMPLE 2

Polybutadiene (cis-1,4 content 98%; $ML_{1+4,100°\ C.}=40$), a styrene/butadiene copolymer (amount of combined styrene 23.5% by weight, $ML_{1+4,100°\ C.}=50$), or polyisoprene (cis-1,4-content 98%, $ML_{1+4,100°\ C.}=80$) was dissolved in cyclohexane in a concentration of 10% by weight. Pd was deposited in an amount of 1% by weight on the CF type carbon black or activated carbon used in Referential Example 1. Using the supported catalyst in an amount of 3 parts by weight per 100 parts by weight of the polymer, each of the above polymers in solution was hydrogenated at 90° C. for 4 hours under a hydrogen pressure of 40 kg/cm².

The results are shown in Table 3.

TABLE 3

| | Degree of hydrogenation (%) | |
|---|---|---|
| Polymer | CF-type carbon black | Activated carbon (average particle diameter 3μ) |
| Polybutadiene | 39.1 | 30.5 |
| Styrene/butadiene copolymer | 53.0 | 41.9 |
| Polyisoprene | 68.5 | 54.8 |

EXAMPLE 1

One kilogram of an acrylonitrile/butadiene copolymer (amount of combined acrylonitrile 39.4% by weight; $ML_{1+4,100°\ C.}=53$) was dissolved in 4 kg of acetone in a 10-liter autoclave. Then, 40 g of a catalyst (corresponding to 4 parts per 100 parts by weight of the polymer) composed of 2% by weight of Pd supported on SRF-type carbon black (Asahi #50, a product of Asahi Carbon Co., Ltd.; average particle diameter 65 mμ, specific surface area 27 m²/g). The inside of the autoclave was purged with nitrogen, and then the polymer was hydrogenated at 60° C. for 5 hours under a hydrogen pressure of 60 kg/cm².

The degree of hydrogenation of the double bonds, measured by the iodine value method, was 83.0%.

A part of the reaction product (polymer solution) was taken, and without separating the catalyst from it, steam was blown into it to obtain crumbs which were then vacuum-dried (sample No. 1). The remainder of the reaction mixture was diluted with a large amount of acetone, and the catalyst was separated from it by a centrifugal separator. Steam was then blown into the residue to obtain crumbs which were then vacuum-dried (sample No. 2).

Each of the two hydrogenated polymer samples was compounded on a roll in accordance with the compounding recipe shown in Table 4, and the compound was heated under pressure at 155° C. for 20 minutes to form a vulcanized product. The properties of the vulcanized product were measured in accordance with JIS K-6301.

TABLE 4

| Compounding recipe | Parts by weight |
|---|---|
| Hydrogenated polymer | 100 |
| Stearic acid | 1 |
| Zinc oxide | 5 |
| Sulfur | 0.5 |
| FEF carbon black | 40(*) |
| Tetramethylthiuram disulfide | 2 |
| Cyclohexylbenzothiazyl sulfenamide | 1 |
| N—Phenyl-N—isopropyl-p-phenylenediamine | 1 |
| Alkylated diphenylamine | 1 |

(*)When the hydrogenated polymer sample contained the carrier carbon, the amount of the FEF carbon black compounded was obtained by subtracting the amount of the carrier carbon from 40 parts by weight.

EXAMPLE 2

In the same way as in Example 1, an acrylonitrile/butadiene copolymer (amount of combined acrylonitrile 39.4%; $ML_{1+4,100°\ C.}=53$) was hydrogenated at 50° C. for 5 hours under a hydrogen pressure of 50 kg/cm² using 3 parts by weight, per 100 parts by weight of the polymer, of a catalyst obtained by supporting 2% by weight of Pd on FEF-type carbon black (Asahi #60, a product of Asahi Carbon Co., Ltd.; average particle diameter 36 mμ, specific surface area 55 m²/g). The degree of hydrogenation was 88.9%. A part of the product was coagulated, without separating the catalyst from it, by blowing steam into it, and dried (sample No. 3). The remainder of the product was coagulated and dried after separating the catalyst (sample No. 4) as in the preparation of sample No. 2.

These two hydrogenated polymer samples were compounded in accordance with the same compounding recipe as shown in Table 4, and vulcanized under the same conditions as in Example 1.

EXAMPLE 3

In the same way as in Example 1, an acrylonitrile/butadiene copolymer (amount of combined acrylonitrile 45.0% by weight; $ML_{1+4, 100° C.} = 50$) was hydrogenated at 50° C. for 4 hours under a hydrogen pressure of 50 kg/cm² using 2 parts by weight, per 100 parts by weight of the polymer, of a catalyst obtained by supporting 1% by weight of Pd on CF-type carbon black (KETJEN BLACK EC, a product of Akzo Co.; average particle diameter 30 mμ, specific surface area 1000 m²/g). The degree of hydrogenation was 95.0%. A part of the reaction product, without separating the catalyst from it, was coagulated by blowing steam into it and dried (sample No. 5). The remainder of the product was coagulated by blowing steam into it after separating the catalyst from it, and dried (sample No. 6) in the same way as in the preparation of sample No. 2. The two hydrogenated polymer samples were compounded in accordance with the same compounding recipe as in Table 4 and vulcanized under the same conditions as shown in Example 1.

into it, and dried (sample No. 7). The remainder of the product was coagulated by blowing steam into it after separating the catalyst from it, and dried (sample No. 8) in the same way as in Example 1. The two hydrogenated polymer samples were each compounded in accordance with the same compounding recipe as shown in Table 4 and vulcanized under the same conditions as in Example 1.

COMPARATIVE EXAMPLE 1

An acrylonitrile/butadiene copolymer (amount of combined acrylonitrile 39.4% by weight; $ML_{1+4, 100° C.} = 53$) was hydrogenated at 60° C. for 5 hours under a hydrogen pressure of 50 kg/cm² using 1 part by weight, per 100 parts by weight of the polymer, of a catalyst obtained by supporting 5% by weight of Pd on an activated carbon carrier (average particle diameter 40 to 50μ). The degree of hydrogenation of the double bonds was 74.3%. A part of the product, without separating the catalyst from it, was coagulated by blowing steam into it, and dried (sample No. 9). The remainder of the product was coagulated by blowing steam after separating the catalyst from it, and dried (sample No. 10). The two hydrogenated polymer samples were compounded in accordance with the same compounding recipe as shown in Table 4, and vulcanized under the same vulcanization conditions as in Example 1.

The vulcanized products of samples Nos. 1 to 10 were examined for strength properties, and also subjected to a test-tube aging test. The results are shown in Table 5.

TABLE 5

| Items of measurement | Example 1 | | Example 2 | | Example 3 | | Example 4 | | Comparative Example 1 | |
|---|---|---|---|---|---|---|---|---|---|---|
| | \multicolumn{10}{c}{Sample No.} |
| | 1* | 2 | 3* | 4 | 5* | 6 | 7* | 8 | 9* | 10 |
| Carrier carbon | SRF | | FEF | | CF | | Activated carbon (average diameter 3 micron) | | Activated carbon (average diameter 40-50 microns) | |
| Degree of hydrogenation (%) | 83.0 | | 88.9 | | 95.0 | | 78.7 | | 74.3 | |
| Properties (initial) | | | | | | | | | | |
| Tensile strength (kg/cm²) | 210 | 215 | 250 | 240 | 268 | 255 | 204 | 205 | 165 | 200 |
| Elongation (%) | 360 | 370 | 450 | 460 | 510 | 500 | 330 | 340 | 260 | 340 |
| 100% Tensile stress (kg/cm²) | 43 | 42 | 40 | 43 | 42 | 41 | 41 | 42 | 39 | 43 |
| Test-tube aging test (150° C. × 72 hrs) | | | | | | | | | | |
| Tensile strength (% change) | −25 | −24 | −21 | −20 | −14 | −13 | −34 | −34 | −36 | −35 |
| Elongation (% change) | −47 | −47 | −44 | −42 | −37 | −36 | −50 | −50 | −60 | −53 |

*The hydrogenated polymer samples contained the carrier-supported catalyst.

EXAMPLE 4

In the same way as in Example 1, an acrylonitrile/butadiene copolymer (amount of combined acrylonitrile 39.4% by weight; $ML_{1+4, 100° C.} = 53$) was hydrogenated at 60° C. for 5 hours under a hydrogen pressure of 50 kg/cm² using 1 part by weight, per 100 parts by weight of the polymer, of a catalyst prepared by supporting 5% by weight of Pd on activated carbon carrier (average particle diameter 3μ) as in Referential Example 1. The degree of hydrogenation of the double bonds was 78.7%. A part of the product, without separating the catalyst from it, was coagulated by blowing steam It is seen from Table 5 that when carbon having an average particle diameter within the range specified in this invention is used, the properties of the resulting polymer are not affected even when it contains the used catalyst, but that when carbon having an average particle diameter outside the specified range is used, the strength properties of the vulcanized product of the resulting polymer become inferior if the used catalyst is not separated.

It is also seen from the data of the test-tube aging test that the hydrogenated polymers in accordance with this invention have the same thermal stability as a hydrogenated polymer from which the catalyst metal has been removed, in spite of the fact that the catalyst metal still remains in the hydrogenated polymer in accordance with this invention.

EXAMPLE 5

The hydrogenated styrene-butadiene copolymer prepared in Referential Example 2 was recovered in the same way as in Example 1 as a polymer containing the carrier supported catalyst (sample No. 11) and a polymer free from the catalyst (sample No. 12).

The two hydrogenated polymer samples were each mixed with compounding agents shown in Table 6 to obtain a rubber compound. The rubber compound was heated under pressure at 145° C. for 45 minutes to obtain a vulcanized product.

The properties of the vulcanized products before and after a test-tube aging test (120° C.×72 hrs) were determined. The results are shown in Table 7.

TABLE 6

| Compounding recipe | Parts by weight |
| --- | --- |
| Hydrogenated polymer | 100 |
| HAF carbon black | 50 |
| Aromatic oil | 5 |
| Zinc oxide | 3 |
| Stearic acid | 2 |
| N—phenyl-N—isopropyl-p-phenylenediamine | 1 |
| 6-Ethoxy-2,2,4-trimethyl-1,2-dihydroquinone | 1 |
| N—oxydiethylene-2-benzothiazole-sulfenamide | 1.1 |
| Sulfur | 1.5 |

TABLE 7

| Items of measurement | Example 5 Sample No. 11* | Example 5 Sample No. 12 |
| --- | --- | --- |
| Carrier carbon | | CF |
| Degree of hydrogenation (%) | | 53.0 |
| Properties (initial) | | |
| Tensile strength (kg/cm$^2$) | 270 | 260 |
| Elongation (%) | 510 | 520 |
| Test tube aging test (120° C. × 72 hrs) | | |
| Tensile strength (% change) | −6 | −6 |
| Elongation (% change) | −40 | −39 |

*Same as in Table 5.

What we claim is:

1. A process for producing a hydrogenated conjugated diene polymer, which comprises hydrogenating the carbon-carbon double bonds of a polymer prepared by polymerizing 10 to 100% by weight of a conjugated diene monomer and 90 to 0% by weight of an ethylenically unsaturated monomer in a solvent using a supported catalyst composed of a hydrogenating catalyst comprising at least one element selected from the group consisting of Ru, Rh, Pd, Ir, Os, Pt, Ag and Au and supported on a carbon carrier having an average particle diameter of 5 m$\mu$ to 10$\mu$ and a specific surface area of 5 to 2000 m$^2$/g. and after the hydrogenation reaction has been completed, separating and recovering the hydrogenated polymer from the solution of the hydrogenated polymer without previously separating the catalyst from the solution, thereby creating an polymer containing said catalyst therein.

2. The process of claim 1 wherein the carbon carrier is a carbon black produced by the channel process or furnace process.

3. The process of claim 1 wherein the hydrogenating catalyst is composed of both Pd and at least one element selected from the group consisting of elements of Groups Ia, IIa, IIIa, IIIb, IVa, IVb, Va, VIa and VIIa of the periodic table, Ag, Au, Sb and Te.

4. The process of claim 1 wherein the amount of the carrier-supported catalyst is not more than 2000 ppm, as the element supported, based on the conjugated diene polymer.